May 19, 1964 D. F. SEVERING 3,133,549
FOLDING CAR COVER
Filed April 10, 1961
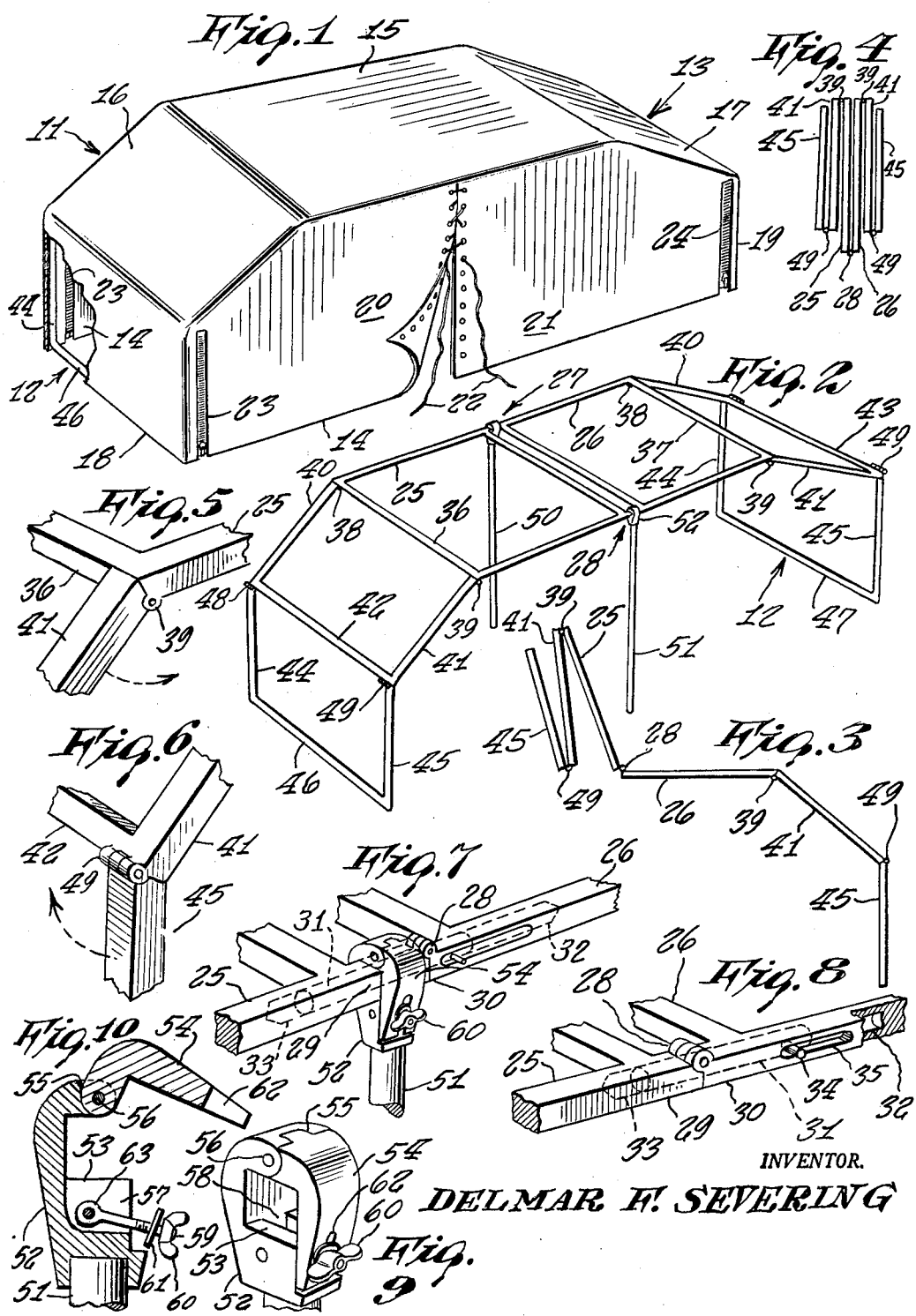
INVENTOR.
DELMAR F. SEVERING

United States Patent Office 3,133,549
Patented May 19, 1964

3,133,549
FOLDING CAR COVER
Delmar F. Severing, 16902 Dixie Highway,
Hazel Crest, Ill.
Filed Apr. 10, 1961, Ser. No. 101,911
1 Claim. (Cl. 135—4)

The present invention relates to canopies and covers for automotive vehicles, and particularly to what I choose to term a folding car cover.

The main object of my invention is to provide a collapsible cover for automotive vehicles, especially for automobiles.

An ancillary object of my invention is to provide such a collapsible car cover which may be collapsed or folded into small, compact compass so as to be readily stored within the trunk of a car when not in active use, and which can be quickly set up for use at will.

Another object of the invention is to provide a folding car cover which consists of two parts, namely a collapsible frame and a folding fabric or other cover supported upon the frame in use.

A further object of this invention is to provide such a two-part car cover which includes a flexible folding outer cover proper of canvas, duck or flexible plastic and a folding frame of wood or metal bars hinged together adapted to stand when open so as to hold the cover proper off the automobile protected by the cover.

An additional object is to provide such a folding car cover which is quickly set up and as quickly taken down, and yet both firm in construction while being light and easily handled.

It is also an object to produce such a car cover as indicated which is serviceable while being easily manufactured and sold at a low figure in order to encourage wide distribution on the market.

Other objects and advantages of my invention will appear in greater detail as the specification proceeds.

In order to facilitate clear comprehension of this invention for a proper appreciation of the salient features thereof, the invention is illustrated on the accompanying drawing forming part hereof, and in which:

FIGURE 1 is a perspective view of a folding car cover made according to the invention and embodying the same in a practical form, with a corner of the outer cover torn away to disclose details of construction;

FIGURE 2 is a perspective view of the inner frame alone of the invention with the outer cover removed;

FIGURE 3 is a view of the same frame partly folded together;

FIGURE 4 is another view of the frame as completely folded into compact condition for storing the same out of the way;

FIGURE 5 is a fragmentary perspective view of inside hinge joint detail from FIGURE 2;

FIGURE 6 is a fragmentary perspective view of an outer hinge joint detail of the same view of FIGURE 2;

FIGURE 7 is a fragmentary perspective view of support detail from the central portion of FIGURE 2;

FIGURE 8 is another similar fragmentary view of the same portion of the frame as seen in FIGURE 7 without the upright support;

FIGURE 9 is a perspective view of the upper portion of the mentioned support or post; while FIGURE 10 is a vertical section of the supporting post of FIGURE 9 shown in opened condition.

Throughout the views, the same reference numerals indicate the same or like parts.

In these days when automobiles are very numerous, it is often a problem to park a car, and especially is it desirable to so protect a car anywhere that the elements will not cause any damage, due to wet weather, snow and hail, etc. This is a problem to many which I propose to solve by means of a special cover for the car, and includes highly useful features along the lines already noted, and such a car cover will now therefore be described in detail in the following.

Hence, in the practise of my invention, and referring again to the drawing, my folding car cover, generally indicated at 11 (FIGURE 1) primarily includes an inner frame generally noted at 12 (FIGURE 2), the outer cover noted at 13 is preferably made of fabric of any desired type having front and rear (not shown) panels or walls 14 having a flat top 15, sloping top portions 16 and 17 sewed, or otherwise secured to the side walls, and end walls 18 and 19 pendently secured to top or roof portions 16 and 17. The side walls 14 are preferably divided into two sections 20, 21 in each case with laces 22 serving to draw them together as partly shown in FIGURE 1. It is self evident that snap fasteners or even hookless fasteners may be used instead, commonly known as zippers. In addition, at both ends, the side walls 14 are separably connected to the end walls 18 and 19 by means of hookless fasteners 23 and 24, so that when all these fastening means are closed, the entire outer cover will present a completely enclosed protection to a car within it, while on the other hand allowing quick and easy opening and removal and subsequent folding together of this cover.

In order to support the outer cover just described and give shape, the frame 12 is provided, and in actual practise is first set up. This frame consists of several individual frame units connected together in a series. Thus, viewing FIGURE 2, two substantially rectangular frame units 25, 26 are hinged together at two opposite points 27, 28, each frame having a pair of extensions 29, 30 at its inner end adjacent to the other frame. As best shown in FIGURE 8, frame 26 at both sides has a sliding lock bolt 31 in a slot 32 extending into corresponding slot 33 in frame 25 into which it may be slid by means of accessible pin 34 extending out through slot 35 for locking both frames into alinement or releasing them at will. At the outer ends 36 and 37 of frames 25 and 26, these frames are hinged by interior hinges 38, 39 to the side members 40, 41 of frames 42 and 43. The ends of frame side members 40 and 41 as well as the ends 36 and 37 abutting them are cut at such obtuse angles that frames 40, 41 will stop in angular positions with respect to each other as seen in FIGURE 5 and also FIG. 2 to support the sloping portions 16 and 17 of the outer cover 13. In this respect, they are oppositely articulated to outer hinges 27 and 28 which allow frames 25 and 26 to fold down at hinges 27 and 28 when bolt 31 is withdrawn from frame slot 33 into frame slot 32 in frame 26.

To the frames 42 and 43 are hinged side members 44 and 45 of end frames 46 and 47 by means of external hinges 48 and 49, allowing the end frames to be folded upward outside frames 42 and 43 as indicated by the broken arrow in FIGURE 6. The side members 44 and 45 are cut at such an angle to frames 42 and 33 that normally the end frames will depend directly downward when open, as seen in FIGURE 2. The inside hinges 38, 39 allow frames 42 and 43 to fold down and under frames 36 and 37 as indicated by the arrow in FIGURE 5. The two top frames 25 and 26 are reinforced when in use by means of two supporting posts 50, 51 supporting the junctions of these top frames at their hinged portions 27 and 28, or extensions 29 and 30.

Each supporting post includes the upright staff with the locking bracket 52 fixed on the upper end thereof and having one side open and a support block 53 within for directly supporting extensions 29 and 30 when the posts are fitted in place. Each post bracket has a swingable closure 54 hinged to the upper overhanging portion 55 of the bracket by means of pin 56 allowing this closure to swing down against seat 57 on the bracket. Support block 53 has an open slot 58 in which is hingedly mounted locking bolt 59, while closure 54 has a downwardly open slot into which the outer end of bolt 59 will fit when nut 60 and washer 61 are temporarily removed to allow the closure member to swing into locking position as shown in FIGURE 9, after which washer 61 and nut may be replaced. When the brackets have both been fitted into place on both sides of frames 25 and 26, and thus locked in position, the two top frames being then firmly supported against collapse by the posts, as shown in FIGURE 2.

Assuming that the entire inner frame 12 has been set up and side bolts locked in place and likewise the two supporting posts, the outer cover may be unfolded from packed condition and easily spread out over frame 12, lacing 22 and the hookless fastener strips 23 and 24 being open to allow freedom of movement. When cover 13 is fully in place on the frame, fasteners 23 and 24 and lace 22 are closed and the lace tied, and the cover structure is then complete, suitable to protect a car within it.

If a car beneath the cover is to be used, the fasteners 23 and 24 are opened at all four corners and lacing 22 untied, and the outer cover 13 pulled off the frame and folded into a small compact package, after which bolts 31 at both sides of the top frames 25, 26, and wing nuts 60 are released, and brackets 52 opened by swinging out closures 54 and posts 50 and 51 lifted free from the frames and the latter folded together as initially shown in FIGURE 3 about hinges 27, 28. The end frames 45 are folded up over frames 42 and 43 on hinges 48, 49 and these last frames folded down to frames 25 and 26 on hinges 38, 39, so that the resulting folded condition of the entire frame will appear as shown in FIGURE 4. Thus, the outer cover and the supporting frame are so compact in folded form as to be in each case readily stored away in the car trunk or elsewhere until the cover is again to be used over the car. Setting up and taking down the cover is a quick and easy performance, as described.

The outer cover may be made of any flexible sheet material, while the inner supporting frame may be made of metal or alloys or of wood or rigid plastic material, as found best, as desired.

Manifestly, variations may be resorted to, and parts and features may be modified or used without others within the scope of the appended claim.

Having now fully described my invention, I claim:

A folding car cover including the combination of an inner supporting frame having a horizontal center top portion and diagonally downward sloping end portions adapted to be folded together for storage, and an outer flexible cover of sheet material adapted to overlie the frame when in use and to be folded into small compact condition for storage, said cover incorporating both slide fastener and lacing fastening means, said frame comprising a plurality of frame units hinged into a series which fold together in zigzag fashion, said inner frame including two substantially rectangular top frames hinged together with top hinges and having side locking bolts and slots for locking the rectangular top frames in horizontal alignment, a pair of further frames hinged to the outer ends of the rectangular top frames with the hinges disposed beneath and disposing the further frames in outwardly sloping positions when set up and allowing them to fold down for storage against the undersides of said rectangular top frames, and a pair of end frame units hinged to the outer ends of the further frames in effective positions for depending down from the further frames when set up, with hinges thereon allowing these end frame units to fold up outside the further frames for storage, a pair of middle supporting posts adapted individually to support the two hinged side portions of the said rectangular top frames, each post having a supporting bracket surmounting the same and having one side open for introduction of a frame portion, and a hinged closure member swingable to close the bracket, and a locking bolt upon each bracket for locking to the closure member in closed position.

References Cited in the file of this patent

UNITED STATES PATENTS

| | | |
|---|---|---|
| 302,535 | Holabird | July 22, 1884 |
| 1,520,486 | Sodemann | Dec. 23, 1924 |
| 1,846,496 | Mills | Feb. 23, 1932 |
| 2,145,353 | Holmes | Jan. 31, 1939 |
| 2,296,358 | Marinsky et al. | Sept. 22, 1942 |
| 2,840,400 | D'azzo | June 24, 1958 |
| 2,960,992 | Klipfel | Nov. 22, 1960 |